US008205194B2

(12) United States Patent
Fries et al.

(10) Patent No.: US 8,205,194 B2
(45) Date of Patent: Jun. 19, 2012

(54) UPDATING OFFLINE VIRTUAL MACHINES OR VM IMAGES

(75) Inventors: Robert M. Fries, Kirkland, WA (US); Michael L. Michael, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 11/772,020

(22) Filed: Jun. 29, 2007

(65) Prior Publication Data

US 2009/0007105 A1    Jan. 1, 2009

(51) Int. Cl.
*G06F 9/44* (2006.01)

(52) U.S. Cl. ........ 717/168; 717/169; 717/170; 717/172; 717/175

(58) Field of Classification Search ............. 717/168
See application file for complete search history.

(56) References Cited

U.S. PATENT DOCUMENTS

| | | | |
|---|---|---|---|
| 5,619,698 A | 4/1997 | Lillich et al. | |
| 5,790,860 A | 8/1998 | Wetmore et al. | |
| 6,202,208 B1 | 3/2001 | Holiday, Jr. | |
| 6,363,524 B1 | 3/2002 | Loy | |
| 7,047,448 B2 | 5/2006 | Rao et al. | |
| 7,062,764 B2 | 6/2006 | Cohen et al. | |
| 7,603,670 B1 * | 10/2009 | van Rietschote | 718/1 |
| 7,797,507 B2 * | 9/2010 | Tago | 711/203 |
| 2005/0198303 A1 * | 9/2005 | Knauerhase et al. | 709/227 |
| 2006/0080651 A1 | 4/2006 | Gupta et al. | |
| 2006/0101181 A1 | 5/2006 | Post et al. | |
| 2006/0184937 A1 * | 8/2006 | Abels et al. | 718/1 |
| 2006/0218544 A1 * | 9/2006 | Chakraborty et al. | 717/168 |
| 2007/0006205 A1 * | 1/2007 | Kennedy et al. | 717/168 |

FOREIGN PATENT DOCUMENTS

WO    WO2005/041031    5/2005

OTHER PUBLICATIONS

Agrawal et al., "Simplifying Distributed Application Upgrades with Simultaneous Execution", School of Computer Science, Carnegie Hall Mellon University, Nov. 2005, 26 pages.
Hicks et al., "Dynamic Software Updating", ACM Transactions on Programming Languages and Systems, Nov. 2005, 27(6), 1049-1096.
Karagkiozoglou, "Devirtualizable Virtual Machines", INFOTECH Seminar Advanced Topics in Distributed Systems, Jul. 2005, 15 pages.

* cited by examiner

*Primary Examiner* — Thomas K Pham
(74) *Attorney, Agent, or Firm* — Woodcock Washburn LLP

(57) ABSTRACT

Methods and systems for updating a virtual machine image. The virtual machine image may be stored as a collection of one or more virtual hard disk files. The virtual machine image is rendered to file-system data. Rendering the virtual machine image to file-system data may comprise mounting the virtual machine image's virtual hard disk drives. An analysis engine is invoked to scan the exposed file-system data to determine the update status of software constructs of the virtual machine image and data indicative of the scanning may be stored. The virtual machine image may be updated while inactive or may be deployed and activated in a protected environment for updating.

13 Claims, 8 Drawing Sheets

| image name | status | details |
|---|---|---|
| image1 | ❌ | needs patch kb1234 |
| image2 | ❌ | needs patch kb5678 |
| image3 | ✓ | up to date as of 2007-06-25:23:42 |

Figure 7

UPDATING OFFLINE VIRTUAL MACHINES OR VM IMAGES

BACKGROUND OF THE INVENTION

A virtual machine ('VM') is a software construct or the like operating on a computing device or the like (i.e., a 'host') for the purpose of emulating a hardware system. Typically, although not necessarily, the VM is an application or the like, and may be employed on the host to instantiate a use application or the like while at the same time isolating such use application from such host device or from other applications on such host. In one typical situation, the host can accommodate a plurality of deployed VMs, each VM performing some predetermined function by way of resources available from the host. Notably, each VM is for all intents and purposes a computing machine, although in virtual form, and thus represents itself as such both to the use application thereof and to the outside world.

Typically, although not necessarily, a host deploys each VM thereof in a separate partition. Such host may include a virtualization layer with a virtual machine monitor ('VMM') or the like that acts as an overseer application or 'hypervisor', where the virtualization layer oversees and/or otherwise manages supervisory aspects of each VM of the host, and acts as a possible link between each VM and the outside world.

One hallmark of a VM is that the VM as a virtual construct can be halted and re-started at will, and also that the VM upon being halted can be stored and retrieved in the manner of a file. In particular, the VM as instantiated on a particular computing device is a singular software construct that can be neatly packaged inasmuch as the software construct includes all data relating to such VM, including operating data and state information relating to the VM. As a result, a VM on a first host can be moved or 'migrated' to a second host by, for example, halting the VM at the first host, moving the halted VM and its associated files to the second host, and re-starting the moved VM at the second host. More generally, a VM can be migrated from a first platform to a second platform in a similar manner, where the platforms may represent different hosts, different configurations of the same host, or the like. In the latter case, and as should be appreciated, a computing device may have a different configuration if, for example, additional memory is added, a processor is changed, an additional input device is provided, a selection device is removed, etc.

A library of VMs may be maintained, where each VM in the library is a halted and stored VM that is available to be retrieved and re-started upon appropriate command. Thus, and as one example, a user or the like in need of a particular processing scenario can peruse the library for an appropriate VM therein that addresses the scenario and upon finding such a VM can retrieve and re-start the VM. In a similar manner, a user or the like that has deployed a VM can at any appropriate point halt the VM and store the halted VM to the library for later retrieval, at which time the stored VM upon being retrieved from the library can be re-started to continue processing.

It should be understood that a VM includes an operating system, and may include one or more use applications and other various software constructs ('software constructs', collectively), and that each software construct of the VM may from time to time require an update in the form of a patch, a hotfix, or the like. As may be appreciated, such an update may be performed for any of several reasons, including to keep the construct current, to provide the construct with additional functionality, to address security issues with regard to the construct, to address functionality flaws with regard to the construct, or the like. For example, the construct may include update functionality that periodically queries an update source for new patches, and if available the update functionality obtains the new patches and installs same, perhaps with the aid and/or approval of a user, administrator, or the like.

Notably, a VM that is halted and stored in a library or the like cannot perform any processing, and thus the update functionality of a construct of such a halted and stored VM is not able to obtain and install patches as may be appropriate. As may be appreciated, the inability of a construct to be updated while the VM thereof is halted and stored may be a minor inconvenience if the nature of the update is relatively insignificant, or may be a major issue if the nature of the update is relatively important. In the former case, an update that may be relatively insignificant could for example be an update that provides additional display features. In the latter case, an update that may be relatively important could for example be an update that addresses a security issue such as a security patch to address a known vulnerability.

SUMMARY OF THE INVENTION

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Keeping computing systems up-to-date can present vexing problems for administrators and users. Administrators may devise complex policies for installing software updates such as security fixes, patches, hotfixes, and the like. These problems may be especially acute for VM images that are stored in a library or the have otherwise been taken off-line. The VMs and any associated software are not updated while the VM is off-line. VM templates, pre-configured VMs that may need some customization prior to deployment, that are stored are also not updated while the templates are stored. Restarting or deploying a stored VM image that is not up-to-date can create serious problems. Some out-of-date software may not function properly or at all. Unpatched security vulnerabilities may be exposed until such time as software on a redeployed VM is updated.

Mechanisms for updating offline virtual machines are described herein. Offline VM images or templates may be mounted without necessarily being restarted. Mounting exposes any operating or file systems within the offline VM, allowing them to be scanned and evaluated with respect to their update status. A virtual machine manager or other supervisory software may manage the scanning and evaluation of the exposed VM image or template. Depending, for example, on administrative policies and the types of updates that are missing, a VM may be flagged as needing a specific update, or an update may be applied. The flagged or updated VM may then be returned to the library, may be deployed in a protected environment for updating, may be updated offline, or may be deployed and updated normally.

BRIEF DESCRIPTION OF THE DRAWINGS

The foregoing summary, as well as the following detailed description of preferred embodiments, is better understood when read in conjunction with the appended drawings. For the purpose of illustrating the invention, example embodiments are shown in the drawings; however, the invention is not limited to the specific methods and instrumentalities disclosed.

FIG. 7 is an example of an interface having visual indicators of the update status of some virtual machine images.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to comprise different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
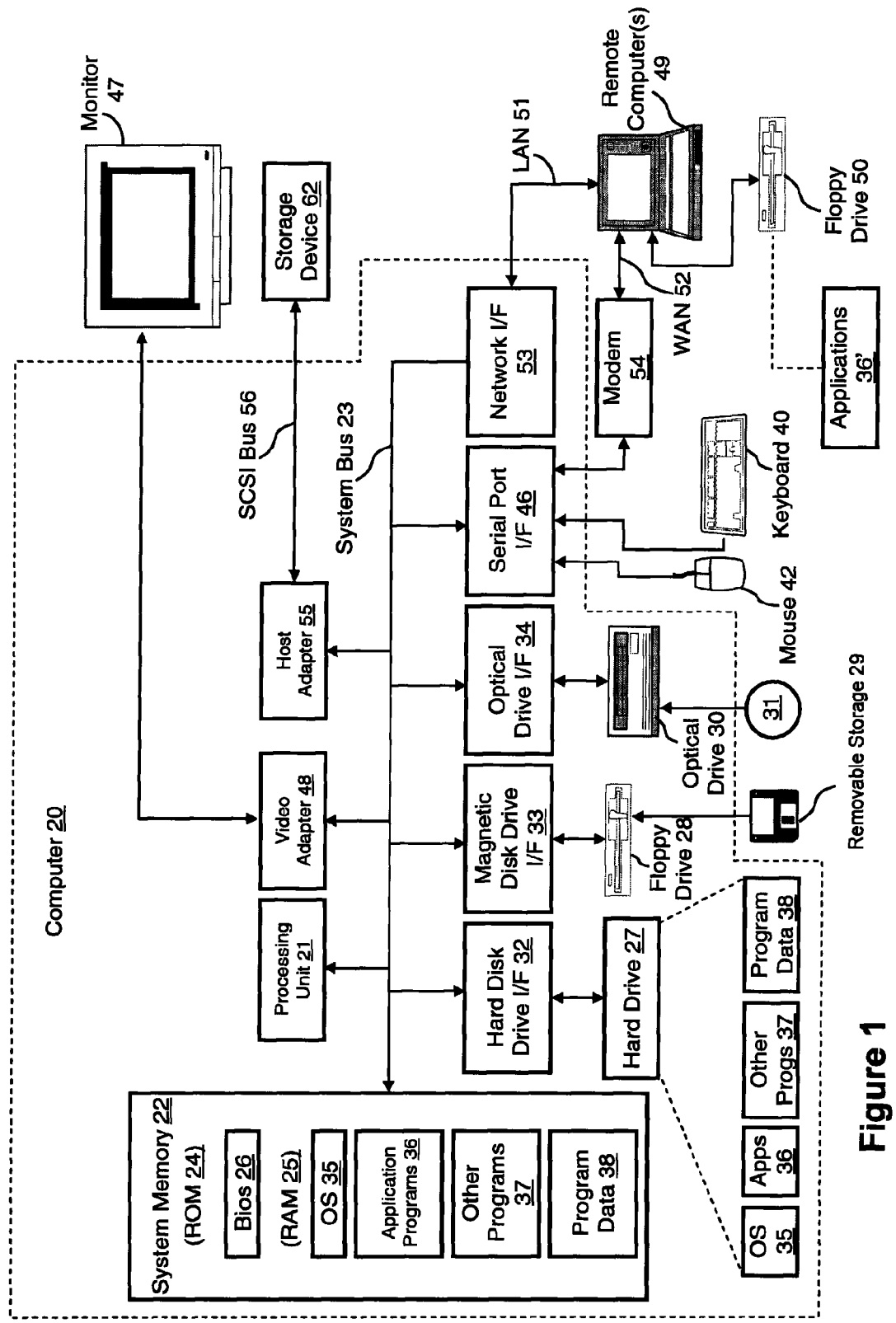
FIG. 1 is a block diagram representing an example operating environment.

Numerous embodiments of the present invention may execute on a computer. FIG. 1 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules comprise routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an example general purpose computing system comprises a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory comprises read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further comprise a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the example environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the example operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may comprise a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically comprise other peripheral output devices (not shown), such as speakers and printers. The example system of FIG. 1 also comprises a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically comprises many or all of the elements described above relative to the personal computer 20, although only a memory storage device 50 has been illustrated in FIG. 1. The logical connections depicted in FIG. 1 comprise a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically comprises a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are example and other means of establishing a communications link between the computers may be used. Moreover, while it is envisioned that numerous embodiments of the present invention are particularly well-suited for computerized systems, nothing in this document is intended to limit the invention to such embodiments.

From a conceptual perspective, computer systems generally comprise one or more layers of software running on a foundational layer of hardware. This layering may be done for reasons of abstraction. By defining the interface for a given layer of software, that layer may be implemented differently by other layers above it. In a well-designed computer system, each layer may rely on the layers adjacent. This allows a layer or a stack of multiple adjoining layers to be replaced without negatively impacting other layers above.

For example, software applications 36 typically rely on lower levels of the operating system 35 to write files to some form of permanent storage, and these applications 36 may not need to understand the difference between writing data to a floppy disk 50, a hard drive 27, or a network folder (not shown). If this lower layer is replaced with new operating system components for writing files, the operation of the upper layer software applications may remain unaffected.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualization program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualization programs to execute concurrently on a single CPU multiple incompatible operating systems. In this latter arrangement, although each operating system is incompatible with the other, virtualization programs can host each of the several operating systems in isolation and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." The terms virtualization, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualization program executing on the operating system software and hardware architecture of the host computer, such as a computer system having a PowerPC processor, mimics the operation of the entire guest computer system.

The general case of virtualization allows one processor architecture to run operating systems and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the Guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC and x86, for example), two approaches could be used: instruction-by-instruction emulation (relatively slow) or translation from the Guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating systems are virtualized and thus an exemplary scenario in accordance with the invention would be emulation of a Windows95®, Windows98®, Windows 3.1, Windows NT 4.0, or Windows Server 2003 operating system on a Virtual Server available from Microsoft Corporation. In various embodiments, the invention thus describes systems and methods for controlling Guest access to some or all of the underlying physical resources (memory, devices, etc.) of the host computer, including the NDIS IM drivers.

The virtualization program acts as the interchange between the physical hardware architecture of the host machine and the instructions transmitted by the software (e.g., operating systems, applications, etc.) running within the emulated environment. This virtualization program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as create certain new virtual resources) by exposing interfaces that are the same as the hardware the VMM is virtualizing. This virtualization enables the virtualization program (as well as the host computer system itself) to go unnoticed by operating system layers running above it.

Processor emulation thus enables a guest operating system to execute on a virtual machine created by a virtualization program (the virtualizer) running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private physical computer system, and thus virtualization programs can allow multiple VMs and "guest systems" to run concurrently on a single "host system." This abstraction allows a VM to be moved from host to host while avoiding many issues related to the particular aspects of the host machines.

Figure 2A:
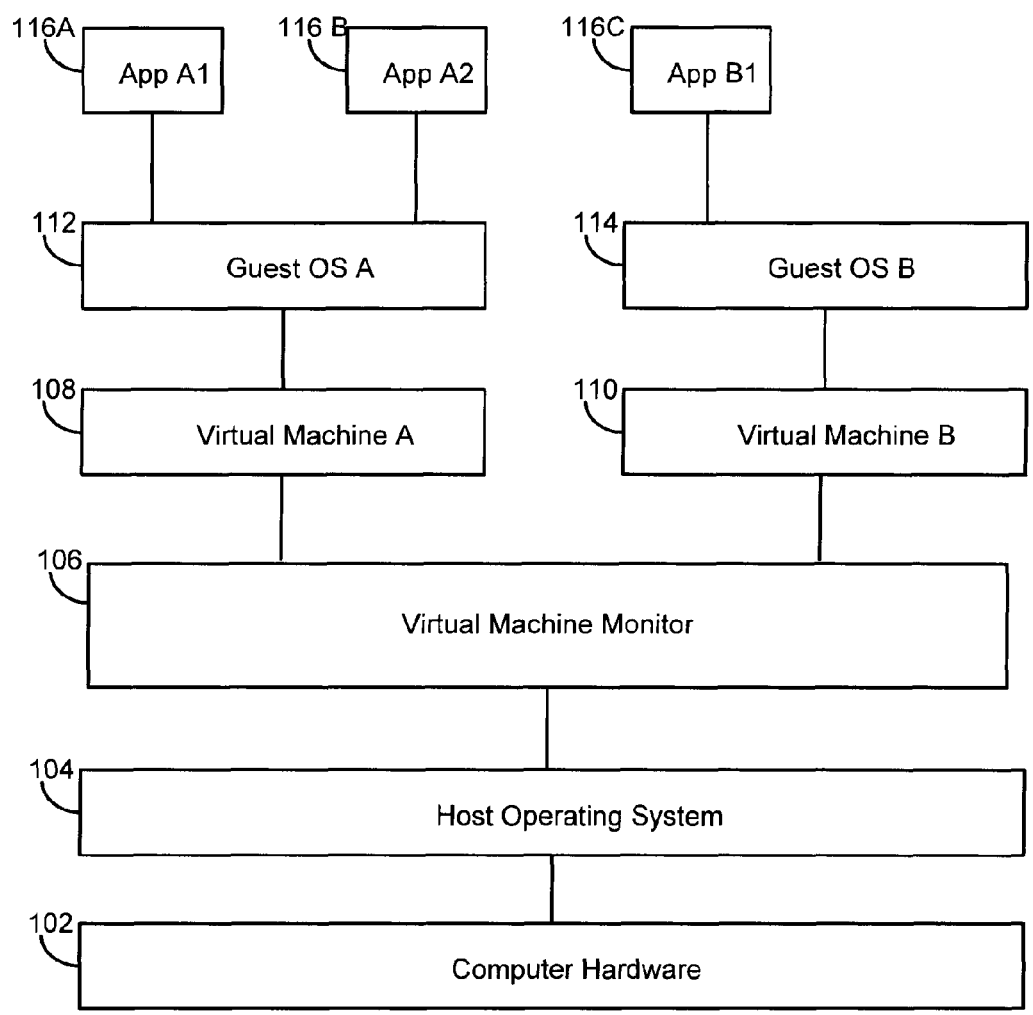
FIGS. 2A and 2B depict example virtualized computing systems.
Figure 2B:
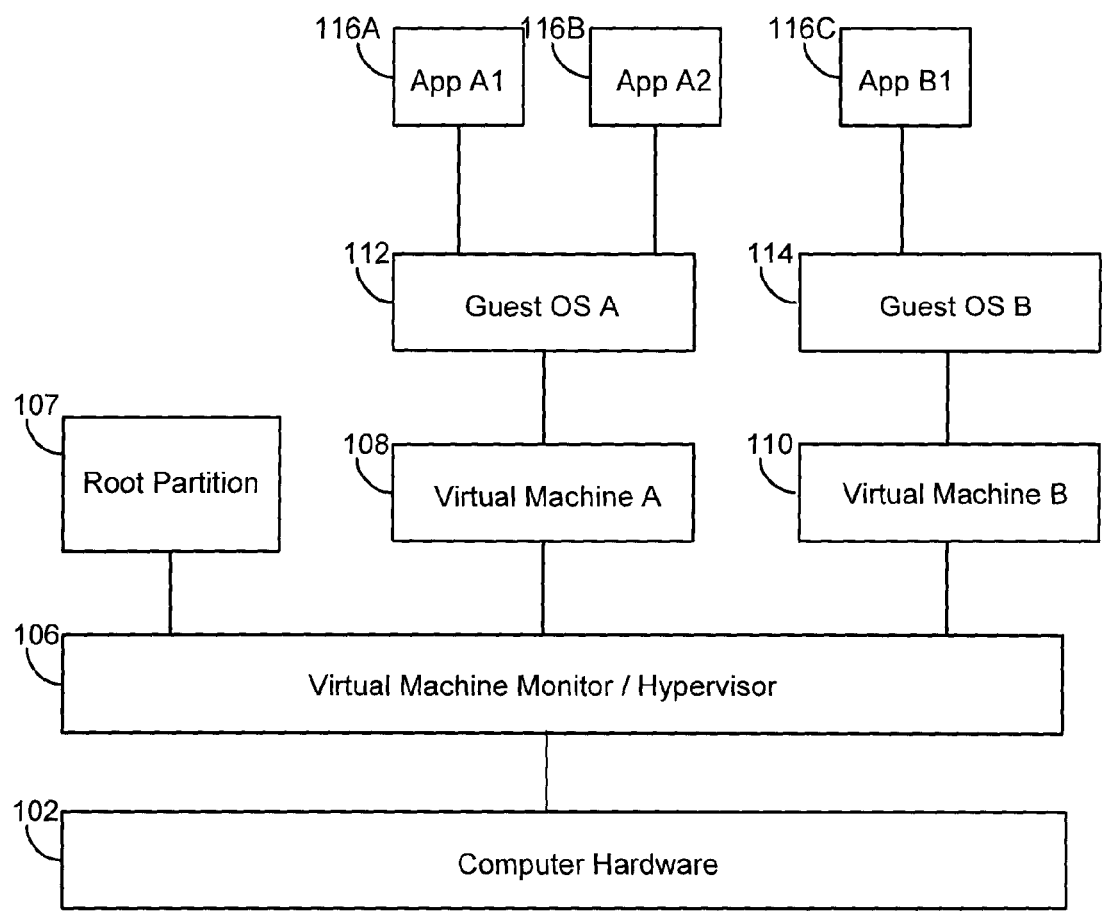

FIGS. 2A and 2B depict example virtualized computing systems. Referring to FIG. 2A, the flexibility of layered software allows a virtual machine 108, 110 to present a virtual hardware layer that may be in fact another software layer. In this way, a virtual machine 108, 110 may create the illusion for the software layers above it that said software layers are running on their own isolated private computer system and physical hardware, and thus virtual machines may allow multiple guest operating systems 112, 114 and associated applications 116A, B, C to run concurrently on a single host system 104.

A virtualized computing system may comprise a host operating system software layer 104 running directly above physical computer hardware 102. A virtual machine monitor (VMM) 106 may virtualize all the resources of the machine by exposing interfaces that are the same as those of the hardware on which the host operating system 104 is running, enabling the host operating system 104 to go unnoticed by guest operating systems 112, 114 running in the virtual machines 108, 110.

Referring to FIG. 2B, in another embodiment, a virtual machine monitor 106 (VMM) software layer acting as a hypervisor may be running directly on computer hardware 102. A root partition 107 running in a layer on top of the VMM 106 may provide host operating system services to the VMM 106. Virtual machine A 108 and virtual machine B 110 may be virtualized computer hardware representations. Virtual machine A 108 and virtual machine B 110 may present a virtualized environment to Guest OS A 112 and Guest OS B 114 respectively. The virtual machine monitor 106 may perform all of the software steps necessary for Guest OS A 112 and Guest OS B 114 to indirectly interact with the real physical computer hardware 102 while leveraging the host OS facilities from the root partition 107. Guest OS A 112 may provide an operating environment for applications 116A, B. Likewise, Guest OS B 114 may provide an operating environment for applications 116C.

In one embodiment, the virtual machine monitor 106 may comprise part of the host operating system 104. In other embodiments, the virtual machine monitor 106 may be an application running above the host operating system 104 and interacting with the computer hardware 102 through said host operating system 104, for example. In yet other embodiments, the virtual machine monitor 106 may comprise a partially independent software system that may interact indirectly with the computer hardware 102 via the host operating system 104 but may also interact with the computer hardware 102. In another embodiment, the virtual machine monitor 106 may comprise an independent software system that may interact with the computer hardware 102 without utilizing the host operating system 104.

The variations for implementing virtual machines and virtual machine monitors or hypervisors described above are just exemplary implementations, and nothing herein should be interpreted as limiting the disclosure to any particular virtualization aspect.

Figure 3:
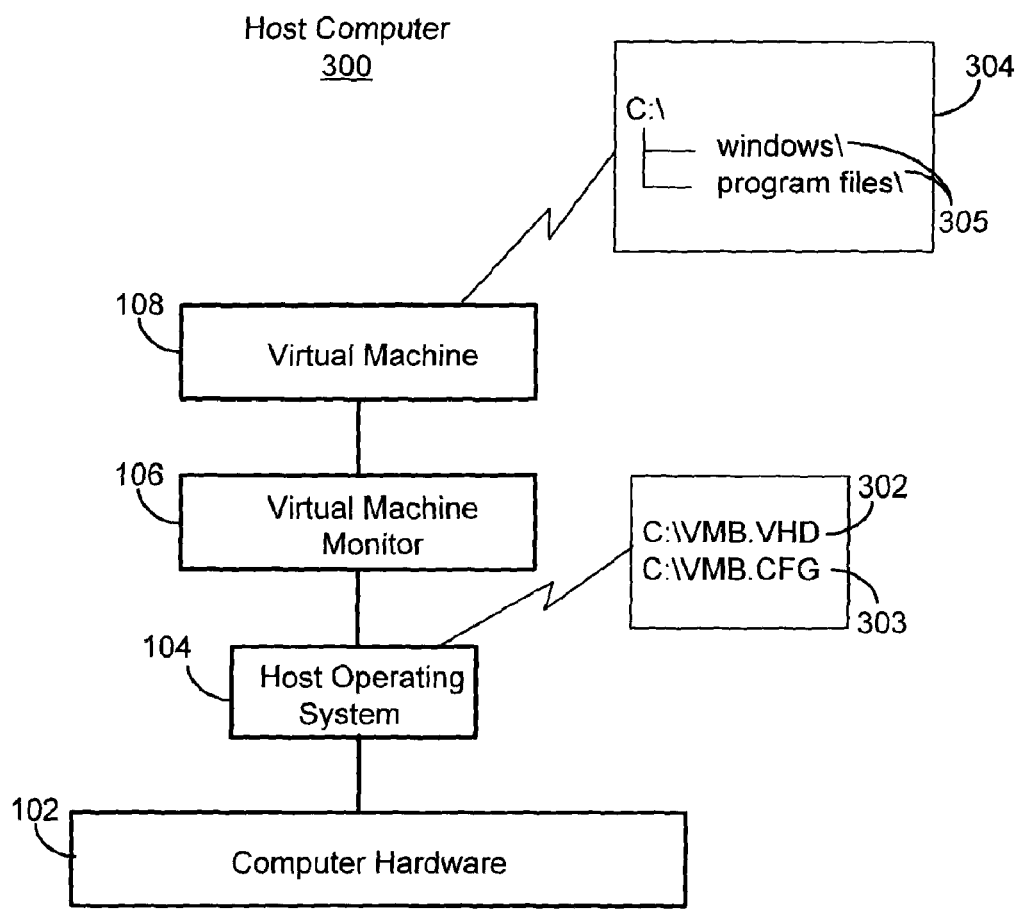
FIG. 3 depicts data in an example virtualized computing system.

FIG. 3 depicts data in an example virtualized computing system. A host computer 300 may comprise computer hardware 102 and a host operating system 104. A virtual machine monitor 106 may virtualize machine resources and facilitate the operation of one or more virtual machines 108. A virtual machine 108 may comprise a virtual machine image 304. The virtual machine image 304 may comprise the data required to operate the virtual machine 108. The virtual machine image 304 may comprise the system files, data files, and related file-system information relating to the virtual machine 108 and the operating system within it. Each virtual machine 108 may be identified by one or more associated virtual machine files.

In one embodiment, the virtual machine image 304 may be represented to the host operating system by one or more virtual hard disk (VHD) files 302 and a configuration file 303. The virtual hard disk files 302 may in part encapsulate a physical disk device 304. Each virtual hard disk file 302 represents a physical disk of a virtual machine 108 and may contain the system files, data files, and file-system information relating to the virtual machine 108. For example, the virtual hard disk file 302 represents a physical hard disk inside the guest operating system, which might in turn contain one or more volumes, file systems, or the like. For example, the hard disk file 302 may comprise data indicative of the application that is running inside the guest operating system and data indicative of the operating system 104 within which the hard disk file 302 was created, the original and current VHD file size, and data indicative of the disk geometry and type.

A virtual hard disk file 302 may be formatted in one of a variety of formats including, by way of examples, a fixed hard disk file in which a flat file the size of the hard disk in the guest operating system is used, a dynamic hard disk file in which the size of the file grows dynamically as data is written to the disk, and a differencing hard disk which depends on a parent hard disk that remains unmodified as new data is written to the differencing disk.

To the virtual machine 108, the virtual hard disk file 302 may be represented as a physical disk device 304 that contains a file-system for example. The virtual machine 108 may access individual system files, data files, and other data represented as being stored on this file-system. For example, the virtual machine 108 may access files and directories 305 associated with this disk device 304.

The virtualization provides a level of abstraction such that what appears as a disk and a file-system to the virtual machine 108 appears as a collection of files to the host operating system 104. In one embodiment, the virtual hard disk file 302 may have a .VHD file extension.

The virtual hard disk file 302 may be accompanied by metadata. The metadata may be stored in a metadata file 303. For example, the metadata file 303 may have a .CFG or a .VMC extension. The metadata may comprise information relating to the nature of the virtual hard disk file 302, for example, whether the virtual hard disk file 302 represents a system or boot drive. Metadata related to the virtual machine configuration may also be stored in a file, such as, for example, with a .VMC extension.

Off-line virtual machines and virtual machine images may be stored in a library file server for extended periods of time. They may be used as templates for new virtual machine creations and deployments, cloning, maintaining backup or checkpoint images of an active virtual machine, or for simply storing the virtual machines until they are needed again. For example, virtual machines could be stored to conserve resources on the virtual machine hosts.

A VM may include an operating system, one or more use applications, and other various software constructs ('software constructs', collectively). Each software construct of the VM may from time to time require an update in the form of a patch or the like. As may be appreciated, such an update may be performed for any of several reasons, including to keep the construct current, to provide the construct with additional functionality, to address security issues with regard to the construct, or the like. Generally, the construct may include update functionality that periodically queries an update source for any new patches, and if available the update functionality obtains the new patches and installs same, perhaps with the aid and/or approval of a user or the like. Possibly complicated policies may be in place for installing software updates. A separate server whose entire purpose is to redistribute updates and patches in an enterprise may be employed. Installing critical or security updates is generally considered especially critical.

Virtual Machine Library

A collection of VM images may be stored in a library in which each VM is stored in a halted and most likely shutdown form and may be retrieved from the library and deployed and re-started on a host machine in an appropriate manner. Note here that the library, VMs, and host may be any appropriate library, VMs, and host. Such a library, VMs, and host are known or should be apparent to the relevant public and therefore need not be set forth herein in any detail beyond that which is already provided.

Each VM in the library is a software construct or the like that when re-started on a host emulates a computing system. Thus, the VM may employ the resources of the host to instantiate a use application or the like while at the same time isolating such use application from such host and other applications on such host. The host may accommodate a plurality of deployed VMs, where each VM independently performs some predetermined function. For example, at least some of the VMs deployed on the host may act as data servers, at least some of such VMs may act as network servers with regard to a network coupled to the host, at least some of such VMs may act as mail servers, and at least some of such VMs may perform low-level functions including maintenance functions, data collection, hardware monitoring, error correction, file management, and the like. Notably, each VM is for all intents and purposes a computing machine, although in virtual form.

The host itself may be an appropriate computing device such as a desktop computer, a laptop computer, a handheld computer, a data assistant, a mainframe computer, or any other type of computing device with the functionality and capacity necessary to host one or more of the VMs. Bearing in mind that each VM may require significant memory, I/O operations, storage space, and processor capacity from the host, however, and also bearing in mind that the host may be expected to accommodate several VMs at any one time, the host likely should have significant power and resources to be able to in fact accommodate such VMs.

The library may be any sort of library on any sort of computing device. For example, the library may reside on a server of sufficient capacity to hold all of the VMs of such library, or may simply reside on an appropriate disk drive of such sufficient capacity. In the latter case, the disk drive may even be part of the host. Note, though, that in the case where there are multiple available hosts, such library may be physically separate from but communicatively coupled to such hosts. Conceivably, the library could itself reside on a virtual machine.

As was noted above, each VM as a virtual construct can be halted and re-started at will, and upon being halted can be stored in the library as a collection of files and retrieved therefrom. In particular, each VM is a singular software construct that can be neatly packaged inasmuch as the software construct includes all data relating to such VM, including operating data and state information relating to the VM. Thus, a VM on a first host can be moved or 'migrated' among hosts by halting the VM at a first host, moving the halted VM to a second host, and re-starting the moved VM at the second host. Thus, a VM on a first host can be moved or 'migrated' to the library by halting the VM at the first host, and moving the halted VM to the library.

Typically, although not necessarily, a VM controller, operating on an appropriate computing device or the like, is provided. Principally, and as may be appreciated, such VM controller is operated to retrieve a stored VM from the library and deploy the retrieved VM by re-starting same on a particular host, and also to halt the deployed VM and store the halted VM at the library, all at the appropriate direction of a user or the like. Thus, a user or the like in need of a particular processing scenario can peruse the library by way of the VM controller for an appropriate VM that addresses the scenario and upon finding such a VM the user can employ the VM controller to retrieve and re-start the VM. In a similar manner, a user or the like that has deployed a VM can at any appropriate point halt the VM and store the halted VM to the library for later retrieval, at which time the stored VM upon being retrieved from the library can be re-started to continue processing. Note here that the VM controller may be any appropriate VM controller, including but not limited to a virtual machine manager. Such a VM controller is known or should be apparent to the relevant public and therefore need not be set forth herein in any detail beyond that which is already provided.

Updating Virtual Machine Images

Patching can present problems for IT administrators, and stored VMs or virtual machine images can present special difficulties. When a VM is online and running, it may generally be updated and patched using facilities managed by software constructs on the VM. However, while it is stored, a virtual machine is inactive and has no access to computing or network resources. Any update functionality of a construct in an inactive VM is inoperative while the VM is inactive and will thus be unable to obtain or install patches or updates as may be appropriate.

It may not be acceptable to wait to apply an update to a VM or one of its constructs until some indeterminate time when the VM may be retrieved from a library and restarted. Restarting a VM without first bringing the VM up-to-date in terms of software updates and patches may expose a restarted machine to undesirable security risks. An operating system or application of an out-of-date VM may be vulnerable to attacks and predators or may lack important functionality until properly updated. An IT administrator may not want to risk activating an out-of-date VM. In addition, because templates of virtual machines can be used to create new virtual machines, it is important that those templates are kept up-to-date.

One way to avoid exposing an out-of-date VM to external risks is to reactivate and deploy the VM in a private network where it may then be updated or patched. Such procedures are often done manually and can be time consuming and error prone. Systems and methods are described herein that enable a VM or a virtual machine image and/or the software constructs that they may comprise to be updated without a need for restarting or activating the VM.

Figure 4:
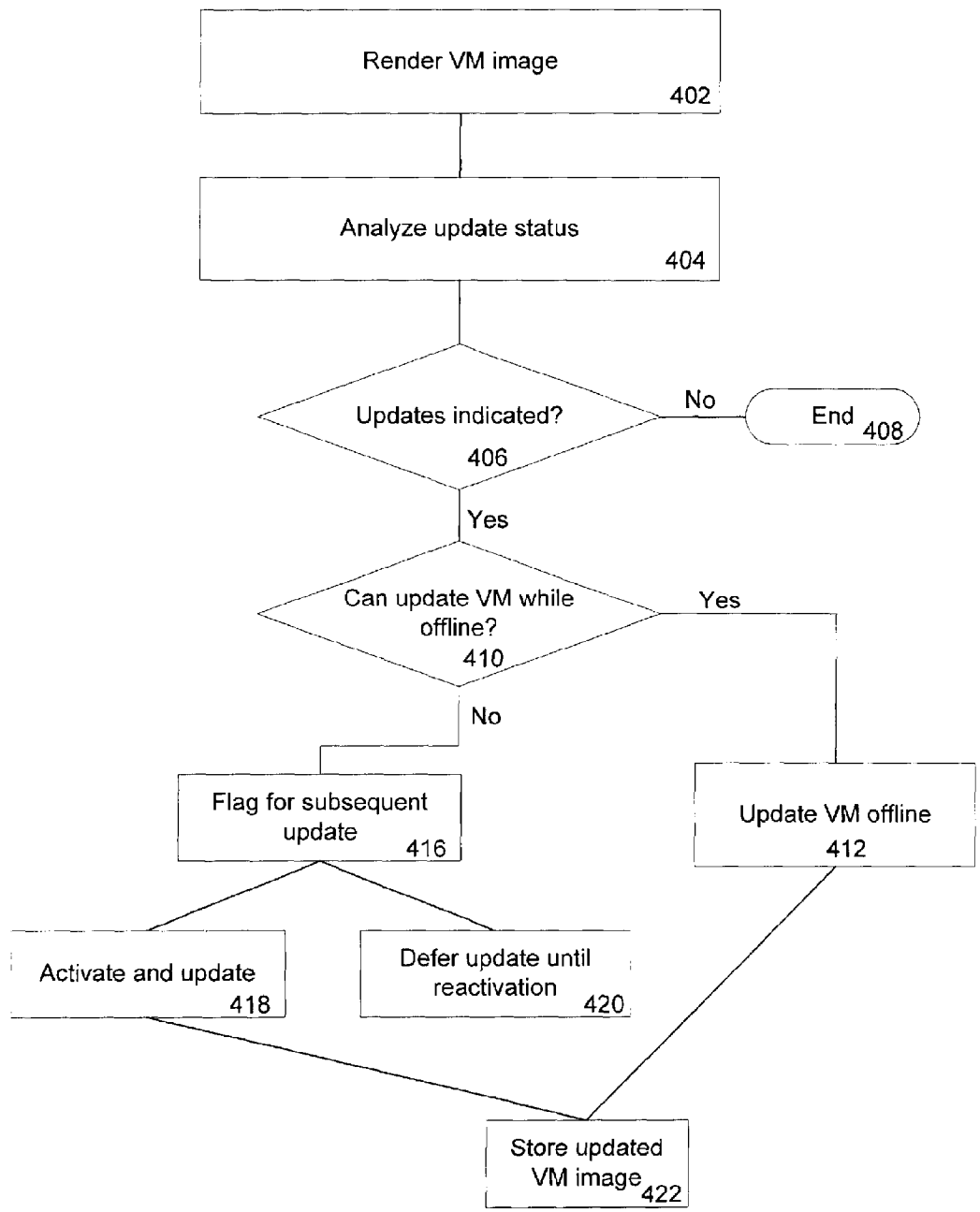
FIG. 4 depicts an illustrative process for updating a virtual machine image.

FIG. 4 is a flow diagram for an illustrative process for updating a virtual machine image. A VM image is rendered 402. The rendering may, for example, be scheduled according to a policy that may be set up, for example when a VM image is entered into storage, and may be updated from time to time. The policy may also describe the types of scans to be performed, the procedures for notification if an update is indicated, and whether and how the VM image is to be updated. Because the virtual machine image may appear as a virtual hard disk file outside of the context of the virtual machine itself, the virtual machine image may be rendered to information suitable for scanning and analyzing. When the virtual machine image is stored as a virtual hard disk file, the files may not be available for scanning, for example because of being in a binary compressed format. For example, the virtual machine image may encapsulate the virtual machine's system files and registry hive. Rendering the stored virtual machine image may comprise translating the virtual machine image into a format such that the files and directories readable inside the virtual machine are now readable by the library operating system or by another computer's operating system, such as a host operating system, for example. The process of rendering may comprise mounting the VHD files on the host operating system via a kernel mode driver (file system driver and the like). The mounter may expose the VHD file as it is exposed inside the VM, as a physical disk device. Then, letters may be assigned to the volumes of the disk and data exposed as if it were inside the guest operating system of the virtual machine image. Since no operating system is running on the exposed data, everything is seen as data and as being offline. Once rendered, objects such as the virtual machines system files, application data, registry hive, and other aspects of the virtual machine image may be available for scanning and analyzing.

In one embodiment, rendering the virtual machine image to file-system data comprises translating the virtual machine image to data understandable by the host operating system's file system. For example, the file-system data may comprise a listing or representation of all the files contained within the virtual machine image. Rendering a virtual machine image 402 may comprise translating metadata information, from a metadata file for example, and relating the metadata information to the contents of the virtual machine image. For example, the metadata information may describe and identify the VHDs and volumes comprising the virtual machine image as system volumes or data volumes.

In one embodiment, rendering the virtual machine image to file-system data may comprise mounting the virtual hard drive image as a physical disk device. When the virtual machine image is mounted, on a host computer or server computer, the virtual machine image may appear under a drive letter as an available volume and file-system. The files within the virtual machine image may be available for scanning and analyzing under the now mounted VHD file as they are now part of the host operating system list of volumes. Mounting may be accomplished with a tool such as a VHD mounter, for example.

In another embodiment, rendering the virtual machine image may comprise a kernel mode driver filter update analysis engine. Such a filter may be used to render the virtual machine image to file-system data available to the update analysis engine without mounting the virtual hard drive image. With such a filter, the virtual machine image may be rendered and analyzed concurrently.

The rendered VM image is analyzed 404 to determine its status with regard to a potential need for updates or patches. A variety of techniques for determining the update status of an active machine are known. The analysis performed on the rendered VM image may be substantially similar to the kind of analysis that would be performed on an active machine, except that the analysis is performed by an agent that is not running inside the machine being analyzed. Depending, for example, on update policies that may be applicable to the VM, various aspects of the VM may be analyzed including, by way of examples, its registry, WMI repository, and/or version information for files and the like. Information about update levels and most recent versions available for the various software constructs associated with the VM may be obtained, for example, via the internet or an intranet. For example, a catalog containing update metadata may be obtained. Update information could also be provided locally, for example via computer readable media. The update information is checked against the current status of the various software constructs associated with the VM and any policies regarding updates are consulted. A patch record indicating what updates are available to be installed is created. The patch record may contain additional information, such as, for example, whether an indicated update can be applied to an offline VM.

If the check indicates that no updates are required or suggested, and the offline virtual machine is up to date, the process may be terminated 408. If instead, one or more updates is indicated, a determination is made whether the VM image can be updated while offline 410. Such a determination may be made with consideration of applicable update policies and the type of update, and may be based, at least in part, on information in the patch record.

If offline updates are may be performed, an update engine operates 412 on the rendered VM image without restarting the VM. The update engine may be activated automatically, for example in response to the indication of the need for the update. Alternatively, a user or administrator or the like may be presented with a user interface indicating the desired update actions and may select updates to be performed. In some embodiments, a user may be allowed to selectively choose which updates to install. The update engine may retrieve needed data, for example via networked communications or an internal source.

Once update data is received and extracted, indicated updates are applied. The file system, registry hive, WMI inventory, and the like of the offline VM are exposed when the VM image is rendered and are available to the update engine via the library or host operating system. Update procedures are known or should be apparent to the relevant public and one skilled in the art will know how to apply updates to parts of the offline VM and therefore need not be set forth herein in any detail beyond that which is already provided. For example, some file system updates may be performed by checking file versions and updating any files for which a newer version is indicated. The updated VM is then converted back to a VM image and stored in the library 422.

In some cases, an update may require a VM to be active in order for the update to be applied. For example, a running VM may need to issue SQL queries or require any other application logic. If updates requiring the VM to be active are indicated, the VM image may be flagged for subsequent update 416. For example, an indication of required updates may be stored in a database or a virtual machine manager related to the stored VM images. The flagged VMs may then be activated and updates applied 418 or an update may be deferred until the VM is selected to be deployed and activated 420.

If the VM is to be activated and updated 418, the activation may be accomplished in a protected environment so as to limit vulnerability of the activated VM until after updates can be applied. For example, a VM image may be deployed to a patch host lacking external access and then activated. Needed updates may then be applied locally. The activation of the VM may be initiated automatically in response to the flagging, or may be initiated by a user or administrator. The updated VM may then converted back to a VM image and stored in the library 422 and the VM database may be updated to reflect the applied patches. If updates cannot be applied successfully in the patch host, attempts to update may be initiated periodically based on a policy until the updates are successfully applied, or the VM image may be flagged as needing an update and an administrator notified.

If updates are to be deferred until the VM is reactivated 420, the updates could be applied automatically upon reactivation or a user or administrator could be presented with a user interface indicated needed updates and presenting options regarding applying the updates. In general a visual indication, such as an icon and/or descriptive text may be provided. FIG. 7 is an example of a user interface 700 listing a collection of virtual machine images 701 702 703 with icons 704 705 indicating that two of the images 701 702 respectively were found to need updates as indicated by the descriptive text 707 708 respectively. One virtual machine image 703 was found to be up to date, as indicated by the icon 706 and descriptive text 709. Metadata regarding the latest patch level of a VM, the health of the patch status, the latest date the VM was scanned for updates, and other information can be stored in a database or a virtual machine manager.

VM images may be created for a variety of purposes. Besides being used to store a deactivated VM, a VM image may represent a template to be used for new virtual machine deployments, for cloning an active machine, for storing checkpoint (point-in-time snapshot of a VM) images of a VM, and the like. The update techniques and systems described herein may be applied to the VM images regardless of the purpose of the VM image. Different policies may control how and when such updates are applied, depending on the purpose of the VM image. For example, a policy could require a checkpoint VM image to be analyzed and updated prior to any reversion to the checkpoint. Reversion to a checkpoint could be forbidden if the checkpoint VM image has not been brought up to date.

Figure 5:
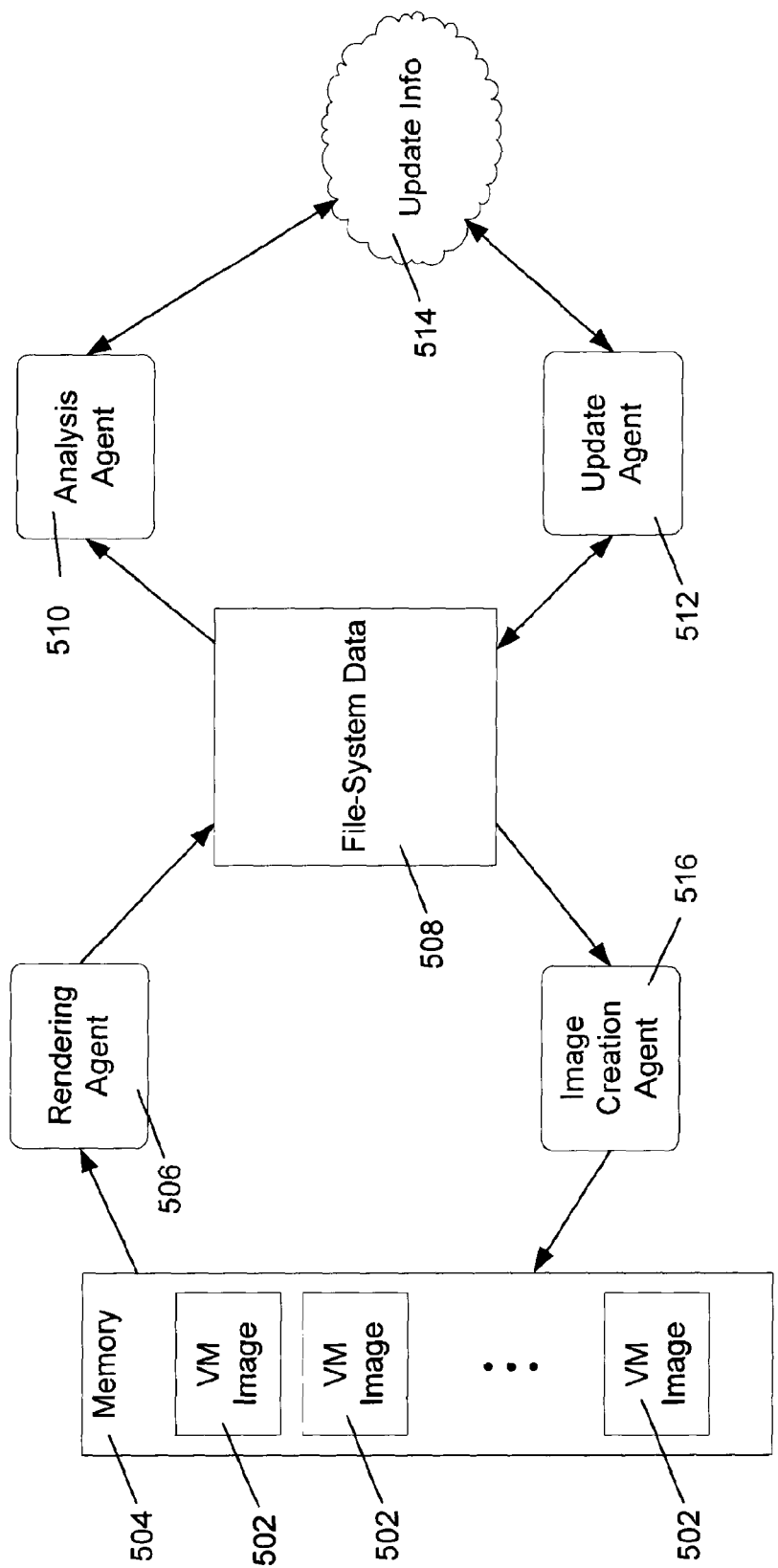
FIG. 5 is a block diagram of an example system embodying an illustrative process.

FIG. 5 depicts a simplified block diagram of an embodiment of a system that may employ the techniques described above. One or more virtual machine images 502 are stored in a memory unit 504. For example, the virtual machine image 502 may comprise one or more virtual hard disk files and associated metadata files, as described above, and the memory unit 504 may be any sort of memory unit suitable for file storage. A rendering agent 506 is configured to render a virtual machine image 502 to file-system data 508. In some embodiments the rendering agent 506 may be a VHD mounter. The rendered file-system data 508 is in a format such that files and system information represented by the virtual machine image are accessible to, for example, a host operating system, another computer's operating system, an analysis agent 510, or an update agent 512. The analysis agent 510 analyzes the file-system data 508 as described above in relation to FIG. 4. The analysis agent 510 may access update information 514. The update information may be obtained remotely, for example via the internet, or locally, for example via computer readable media. Based on the analysis, an update agent 512 may be initiated. The update agent 512 accesses the rendered file-system data 508 and applies any updates indicated by the analysis. An image creation agent 516 uses the newly updated file-system data to create an updated VM image and stores it back in the memory 504.

Figure 6:
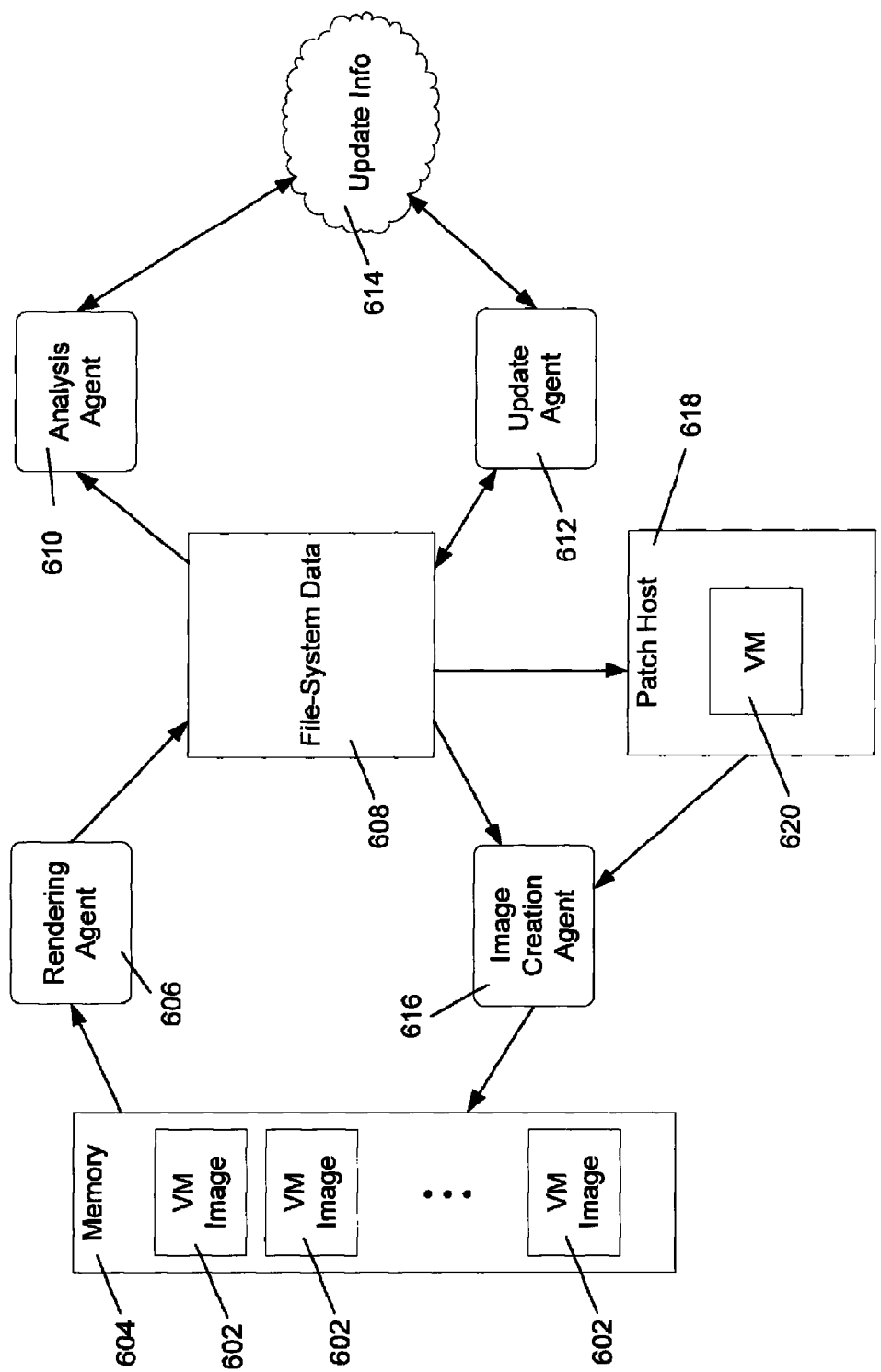
FIG. 6 is a block diagram of another example system embodying an illustrative process.

FIG. 6 depicts a simplified block diagram of another embodiment of a system that may employ the techniques described above. One or more virtual machine images 602 are stored in a memory unit 604. For example, the virtual machine image 602 may comprise one or more virtual hard disk files and associated metadata files, as described above, and the memory unit 604 may be any sort of memory unit suitable for file storage. A rendering agent 606 is configured to render a virtual machine image 602 to file-system data 608. An analysis agent 610 accesses update information 614 and analyzes the file-system data 608 as described above in relation to FIG. 4. If any updates that can be performed offline are identified, may be initiated and the VM image updated as described above in relation to FIG. 5. If updates requiring the VM to be active in order to be updated are indicated, the VM image is deployed to a patch host 618 and reactivated therein. The patch host provides a protected environment so as to limit vulnerability of the activated VM until after updates can be applied. Once updated, the VM may then be converted back to a VM image by an image creation agent 616 and stored back in the memory 604.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. Therefore, the present disclosure should not be limited to any single aspect, but rather construed in breadth and scope in accordance with the appended claims.

What is claimed:

1. A method comprising:
   mounting a virtual disk for an inactive virtual machine as a physical hard drive within an executing instance of a virtualization program, the virtual disk including data indicative of an inactive guest operating system;
   analyzing, while the virtual machine is inactive, at least a portion of the data indicative of the guest operating system to determine version information for the guest operating system; and
   identifying a patch for the guest operating system using the version information for the guest operating system.

2. A method as recited in claim 1, wherein analyzing at least the
   portion of the data indicative of the guest operating system further comprises:
   analyzing configuration settings for the guest operating system.

3. A method as recited in claim 1, further comprising:
   installing, while the guest operating system is inactive, the patch for the guest operating system.

4. A method as recited in claim 3, further comprising:
   storing the file in a virtual machine library.

5. A method as recited in claim 1, further comprising:
   sending the file to a patch host configured to instantiate the virtual machine and install the patch for the guest operating system, the patch host lacking a network connection to an external network.

6. A system for updating a virtual machine image, the system comprising:
   a computer system including:
      a processor; and
      a memory coupled to the processor when powered, the memory including executable instructions stored thereon that upon execution cause the processor to:
         open a file including a virtual disk for an virtual machine that is inactive, the virtual disk including data indicative of a guest operating system that is offline;
         scan, while the guest operating system is inactive, the data indicative of the guest operating system to identify update status information for the guest operating system; and
         identify a patch to apply to the guest operating system using the update state information for the guest operating system.

7. The system of claim 6, wherein the memory further comprises instructions that upon execution cause the processor to:
   mount the file as a physical hard drive within a host operating system.

8. The system of claim 6, wherein the memory further comprises instructions that upon execution cause the processor to:
   overwrite at least a portion of the data indicative of the guest operating system with the patch while the virtual machine is offline.

9. The system of claim 6, further comprising:
   a patch host lacking a network connection to an external network, the patch host including:
      a host-processor;
      a host-memory coupled to the host-processor when powered, the host-memory including executable instructions stored thereon that upon execution cause the host-processor to:
      instantiate the virtual machine;
      run the guest operating system;
      overwrite at least a portion of the data indicative of the guest operating system with the patch.

10. The system of claim 6, wherein the memory further comprises instructions that upon execution cause the processor to:
    display an indicator of the update status of the guest operating system, wherein the indicator comprises at least one of an icon, status, or descriptive text.

11. A computer readable storage medium comprising computer executable instructions that upon execution cause a computer system to:
    mount a virtual disk for an offline virtual machine as a physical hard drive, the virtual disk including data indicative of an offline guest operating system;
    analyze, while the guest operating system is offline, at least a portion of the data indicative of the guest operating system to determine a list of updates for the guest operating system, the list of updates identifying at least one patch; and
    overwrite, while the guest operating system is offline, at least a portion of the data indicative of the guest operating system with at least the patch identified in the list of updates.

12. A computer readable storage medium as recited in claim 11, wherein the instructions that upon execution cause the computer system to analyze at least the portion of the data indicative of the guest operating system further comprise instructions that upon execution cause the computer system to:
    run an update agent within a host operating system, the update agent configured to scan through the data indicative of the guest operating system searching for version information for the guest operating system.

13. A computer readable storage medium as recited in claim 11, wherein the computer readable storage medium further comprises instructions that upon execution cause the computer system to:
    instantiate the virtual machine;
    run the guest operating system; and
    overwrite, while the guest operating system is running, at least a portion of the data indicative of the guest operating system with at least one patch identified in the list of updates.

* * * * *

UNITED STATES PATENT AND TRADEMARK OFFICE
CERTIFICATE OF CORRECTION

PATENT NO. : 8,205,194 B2  
APPLICATION NO. : 11/772020  
DATED : June 19, 2012  
INVENTOR(S) : Fries et al.

Page 1 of 1

It is certified that error appears in the above-identified patent and that said Letters Patent is hereby corrected as shown below:

In column 16, line 2, in Claim 6, delete "state" and insert -- status --, therefor.

Signed and Sealed this
Twenty-third Day of October, 2012

David J. Kappos
*Director of the United States Patent and Trademark Office*